US007796976B2

(12) United States Patent
Yamato (10) Patent No.: US 7,796,976 B2
(45) Date of Patent: Sep. 14, 2010

(54) COMMUNICATION MEDIATION APPARATUS THAT MEDIATES COMMUNICATION BETWEEN NETWORKS, COMMUNICATION METHOD AND COMPUTER READABLE MEDIUM

(75) Inventor: Katsumi Yamato, Chiba (JP)

(73) Assignee: Kabushiki Kasiha Toshiba, Tokyo (JP)

( * ) Notice: Subject to any disclaimer, the term of this patent is extended or adjusted under 35 U.S.C. 154(b) by 1161 days.

(21) Appl. No.: 11/389,531

(22) Filed: Mar. 27, 2006

(65) Prior Publication Data

US 2006/0252412 A1    Nov. 9, 2006

(30) Foreign Application Priority Data

Mar. 30, 2005  (JP)  ............................. 2005-099285

(51) Int. Cl.
    *H04L 12/58* (2006.01)
(52) U.S. Cl. .................................... 455/412.1; 709/213
(58) Field of Classification Search ................ 455/41.2, 455/412.1; 709/213
    See application file for complete search history.

(56) References Cited

U.S. PATENT DOCUMENTS 6,167,436 A * 12/2000 Yamane et al. ............... 709/213
7,050,420 B2 * 5/2006 Findikli ...................... 370/350
7,158,758 B2 * 1/2007 Lim et al. ................... 455/41.3

OTHER PUBLICATIONS

Bluetooth Specification version 2.0+EDR (vol. 3), *Link Controller Operation*, Nov. 4, 2004, pp. 168-183.
Cordeiro et al., *Design and Implementation of QoS-driven Dyamic Slot Assignment and Piconet Partitioning Algorithms over Bluetooth WPANs*, IEEE INFOCOM 2004, 12 pages.

* cited by examiner

*Primary Examiner*—Nay A Maung
*Assistant Examiner*—Angelica M Perez
(74) *Attorney, Agent, or Firm*—Nixon & Vanderhye, PC (57) ABSTRACT

An example communication mediation apparatus mediates communication between networks and involves receiving a packet, from a first communication device belonging to a network under connection, addressed to a second communication device belonging to another network and calculating expected reception time of a packet transmitted next from the first communication device on the basis of reception history of packets from the first communication device and a traffic parameter that is information concerning a communication traffic determined with the first communication device.

17 Claims, 7 Drawing Sheets

| PICONET NO. | STAY START TIME | STAY END TIME |
|---|---|---|
| 100 | T1 | T2 |
| 110 | T2 | T3 |

COMMUNICATION MEDIATION APPARATUS THAT MEDIATES COMMUNICATION BETWEEN NETWORKS, COMMUNICATION METHOD AND COMPUTER READABLE MEDIUM

CROSS-REFERENCE TO RELATED APPLICATIONS

This application claims the benefit of priority under 35 USC §119 to Japanese Patent Application No. 2005-099285 filed on Mar. 30, 2005, the entire contents of which are incorporated herein by reference.

BACKGROUND OF THE INVENTION

1. Field of the Invention

The present invention relates to a communication mediation apparatus and communication method which implement communication extending over a plurality of wireless communication networks, and a computer readable medium.

2. Related Art

In recent years, wireless communication devices adopting Bluetooth (trademark, hereafter omitted) communication standards to implement data transmission and reception between communication devices by using frequencies in a 2.4 GHz band and the frequency hopping technique, have increased. By using the communication standards, the communication can be easily implemented between communication devices which are relatively at a short distance.

According to the Bluetooth standards, each network is called a piconet. If one of the devices in each piconet is designated as a master device, the number of devices (slave devices) that can be connected to the master device is limited to up to seven. If eight or more devices are to be connected, it must be made possible to recognize that devices connected to each piconet belong to another piconet as well. A group of piconets constituted with such an object is called a scatternet. It doesn't matter if the number of devices belonging to each of the piconets included in the scatternet is less than eight.

In the scatternet, a predetermined slave device which connects piconets to each other goes round a plurality of piconets in a time division manner, and thereby multiplex communication is implemented virtually. This operation is called piconet switching. A device belonging to each piconet communicates with a device belonging to another piconet via the device which goes round the piconets in the time division manner.

Outlines of mechanisms of the piconets and scatternet are disclosed in United States Patent Application No. 2004/0136338 (for example, FIG. 2).

If a certain device desires to communicate with a device belonging to another piconet at this time, the certain device is kept waiting until the predetermined slave device conducts piconet switching to the piconet to which the device desired to communicate with by the certain device belongs.

If a scatternet is constituted, communication among a plurality of piconets included in the scatternet is implemented using the piconet switching.

However, communication with the piconet to which the opposite party of the communication belongs is restricted to within time when the slave device is piconet-switched to the target piconet. If communication timing does not coincide with piconet switching timing in the scatternet, waiting for communication start occurs frequently. As a result, not only the throughput is lowered, but also there is a possibility that a problem will occur in service of video images and voices required to have the real time property.

SUMMARY OF THE INVENTION

According to an aspect of the present invention, there is provided a communication mediation apparatus which mediates communication between networks, comprising: a switching unit configured to switch connection destination networks; a packet receiver configured to receive a packet, from a first communication device belonging to a network under connection, addressed to a second communication device belonging to another network; a traffic parameter storage configured to store information concerning a communication traffic determined with the first communication device as a traffic parameter; a packet reception time calculator configured to calculate expected reception time of a packet transmitted next from the first communication device on the basis of reception history of packets from the first communication device and the traffic parameter stored in the traffic parameter storage; and a controller configured to control the switching unit so as to switch the connection destination network.

According to an aspect of the present invention, there is provided with a communication method of performing in a communication mediation apparatus which mediates communication between networks, comprising: switching connection destination networks; receiving a packet, from a first communication device belonging to a network under connection, addressed to a second communication device belonging to another network; calculating expected reception time of a packet transmitted next from the first communication device on the basis of reception history of packets from the first communication device and a traffic parameter that is information concerning a communication traffic determined with the first communication device; and switching the connection destination network.

According to an aspect of the present invention, there is provided a computer readable medium storing a program for causing a computer capable of mediating communication between networks, to execute instructions to perform steps of: switching connection destination networks; receiving a packet, from a first communication device belonging to a network under connection, addressed to a second communication device belonging to another network; calculating expected reception time of a packet transmitted next from the first communication device on the basis of reception history of packets from the first communication device and a traffic parameter that is information concerning a communication traffic determined with the first communication device; and switching the connection destination network.

DETAILED DESCRIPTION OF THE INVENTION

First Embodiment

In the scatternet including a plurality of piconets each including communication devices which conduct wireless communication in accordance with the Bluetooth standards, the time division policy (piconet switching policy) among piconets becomes a factor which exerts a great influence upon the communication performance of devices belonging to a certain piconet and communication performance of devices belonging to piconets different from the certain piconet.

Figure 1:
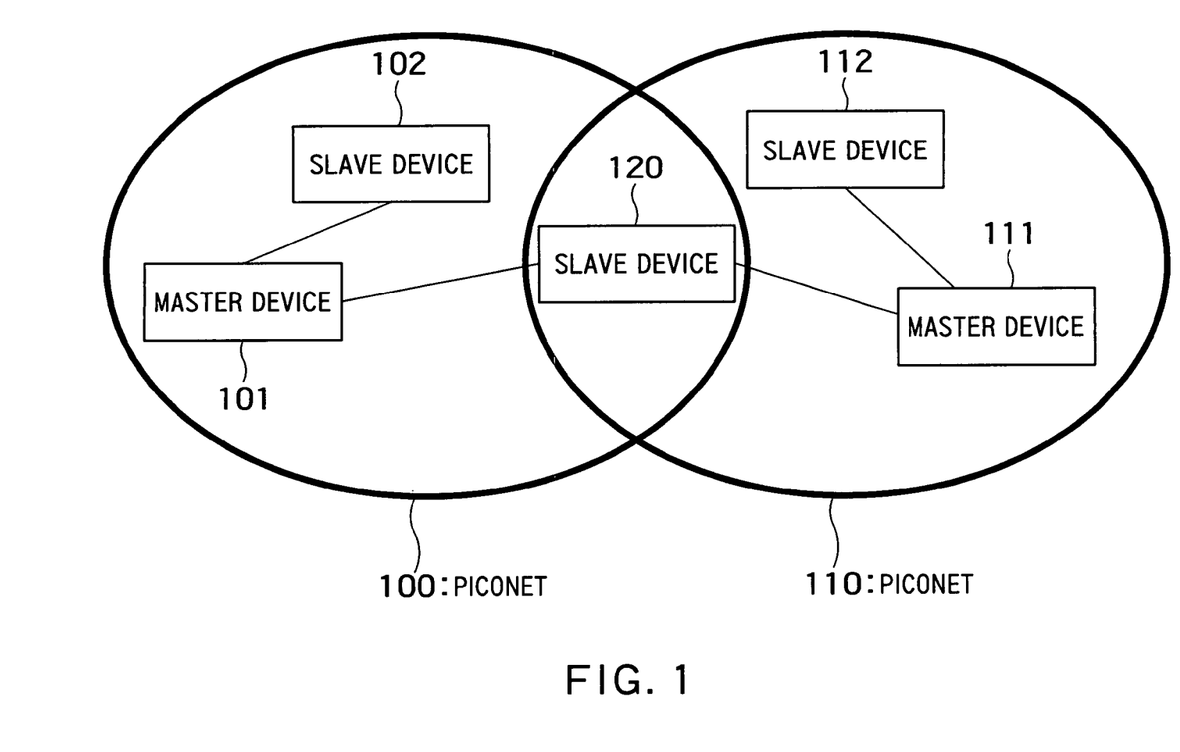
FIG. 1 is a diagram showing an example of a communication system in a first embodiment.

FIG. 1 is a diagram showing an example of a communication system in the present embodiment. In FIG. 1, two piconets, i.e., a piconet 100 and a piconet 110 are shown. A master device 101 and a slave device 102 belonging to the piconet 100 are shown. A master device 111 and a slave device 112 belonging to the piconet 110 are shown. A slave device (communication mediation apparatus) 120 behaves as if it belongs to each of the piconets 100 and 110.

Each of the piconet 100 and the piconet 110 is one network according to the Bluetooth standards. According to the Bluetooth standards, up to seven slave devices can belong to a master device which is one of devices belonging to a piconet. Each piconet is constituted in the communication range of a wireless communication module conforming to the Bluetooth standards. Typically, each piconet has a service area ranging from approximately several meters to approximately ten and several meters.

As represented by the master device 101 and the master device 111, one master device is set in each piconet, and the master device has a function of acting as a mediator for communication between slave devices belonging to the piconet.

The slave device 102 and the slave device 120 are communication devices which belong to the piconet 100 centering around the master device 101. The slave device 112 and the slave device 120 are communication devices which belong to the piconet 110 centering around the master device 111. In other words, the slave device 102 and the slave device 120 are devices belonging to the piconet 100, and the slave device 112 and the slave device 120 are devices belonging to the piconet 110. At this time, the slave device 120 functions as a slave device belonging to a plurality of piconets to constitute the scatternet.

Figure 2:
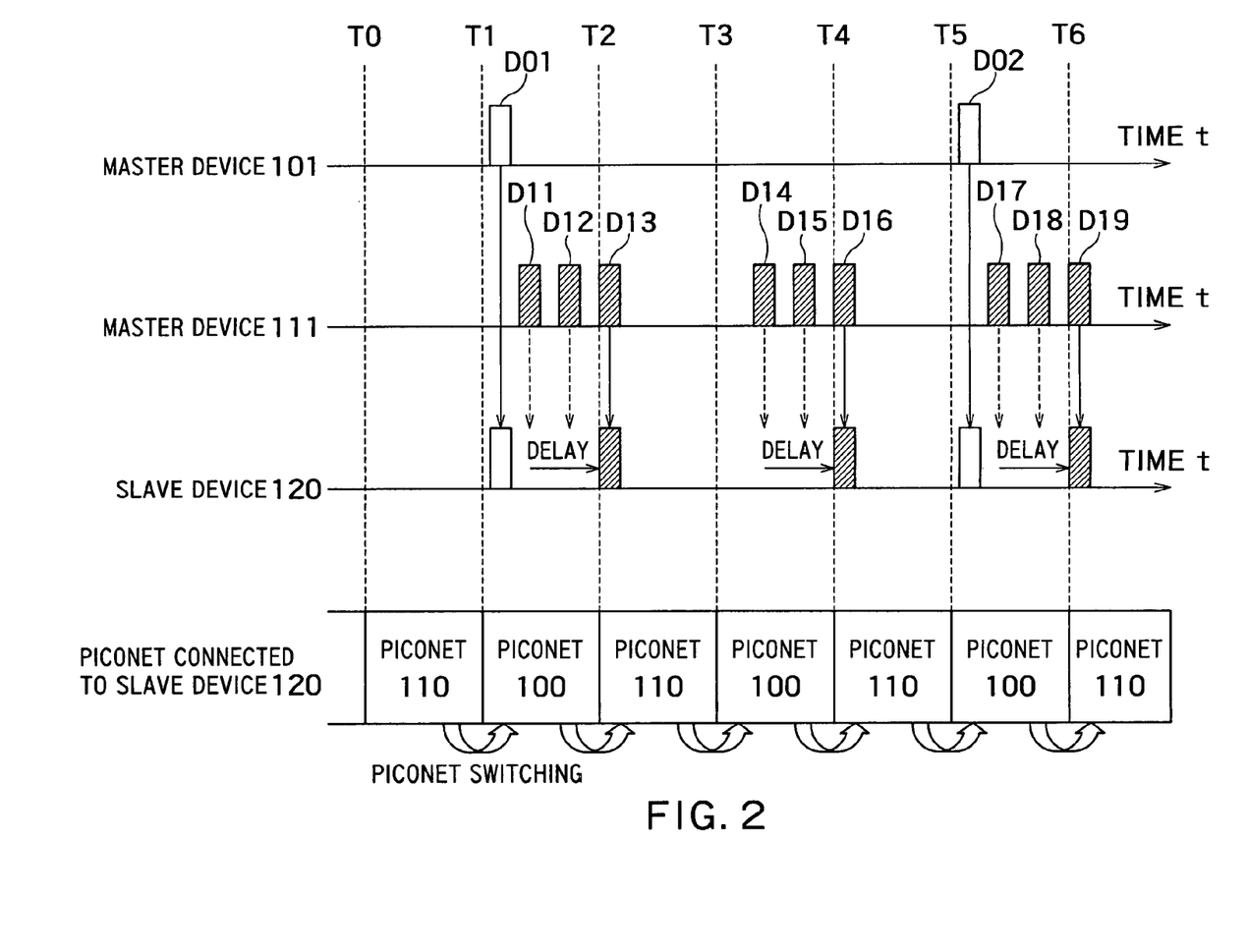
FIG. 2 is a diagram showing an example of a communication sequence in a scatternet in the case where it is constituted using an already known technique.

FIG. 2 shows an example of a communication sequence in the scatternet in the case where it is constituted using an already known technique. The master device 101 belonging to the piconet 100, the master device 111 belonging to the piconet 110, and the slave device 120 belonging to both the piconet 100 and the piconet 110 are shown. Furthermore, the piconet piconet-switched by the slave device 120 is shown in a time sequence form.

It is now supposed that the slave device 120 has piconet-switched to the piconet 110 at time T0. It is supposed that the slave device 120 further piconet-switches to piconet 100 at time T1. If the master device 101 transmits data D01 toward the slave device 120 at this time, the data D01 is received by the slave device 120 without keeping the master device 101 waiting, because the slave device 120 is already piconet-switched to the piconet 100.

On the other hand, if the master device 111 belonging to the piconet 110 attempts to transmit data D11 to the slave device 120, the data D11 is not received by the slave device 120 while the slave device 120 is piconet-switched to the piconet 100. The master device 111 cannot know which piconet the slave device 120 which is the transmission destination is piconet-switched to at this time. Therefore, the master device 111 repeats the retransmission as represented by data D12 and data D13 until reception conducted by the slave device 120 is completed.

After the transmission of the data D12, the slave device 120 is piconet-switched to the piconet 110 again at time T2. For the first time, therefore, it becomes possible for the slave device 120 to receive data D13 retransmitted from the master device 111 belonging to the piconet 110. A time period between the time when the master device 111 begins to transmit the data D11 and the time when the data D13 is received becomes a delay time taken to transmit and receive the data D13. If this delay time between the time when data transmission is started and the time when the reception is actually completed cannot be neglected, the throughput of the communication is worsened. For example, the case where a required communication quality cannot be ensured in communication data (such as a video signal or an audio signal) for which a real time property is required is also conceivable.

In the present embodiment, it is made hard to cause the delay time due to the waiting as described above by presuming a transmission time of the next time of the master device and manipulating timing of the piconet switching of the slave device 120 included in the scatternet.

Figure 3:
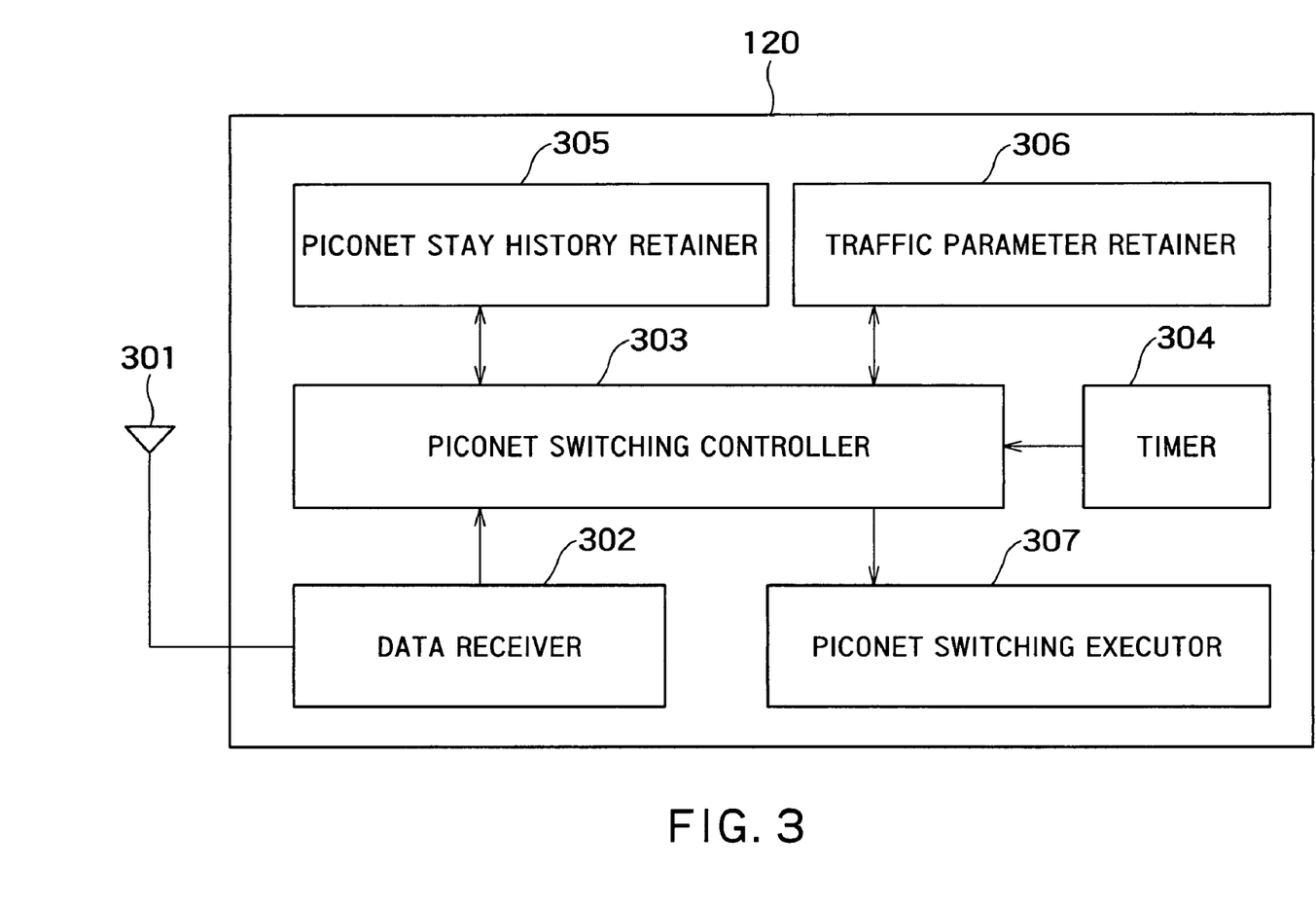
FIG. 3 is a diagram showing an example of a block configuration diagram of a slave device in a first embodiment.

FIG. 3 is a diagram showing an example of a block configuration diagram of the slave device 120 in the present embodiment.

In FIG. 3, an antenna 301, a data receiver 302, a piconet switching controller 303, a timer 304, a piconet stay history retainer 305, a traffic parameter retainer 306, and a piconet switching executor 307 are shown. A function of at least one of the data receiver 302, the piconet switching controller 303, the timer 304 and the piconet switching executor 307 may be implemented by causing a computer to execute a program including instructions. The program may be stored in a computer readable medium.

The antenna 301 has a function of receiving wireless radio waves from master devices belonging to the piconet 100 and the piconet 110.

The data receiver 302 has a function of selectively receiving a radio wave signal picked up by the antenna 301 and conducting signal processing on the radio wave signal, and thereby processing the radio wave signal so as to make it possible to handle the radio wave signal in subsequent processing. In the present embodiment, the data receiver 302 has a function required for signal processing conforming to the Bluetooth standards.

The piconet switching controller 303 controls piconet switching operations of the slave device 120 in the present embodiment. For example, the piconet switching controller 303 has a function of controlling the changeover time interval of the piconet switching.

The timer 304 has a function of measuring the time, and provides the piconet switching controller 303 with time information. The time information is used to determine the changeover time interval of the piconet switching.

Figure 4:
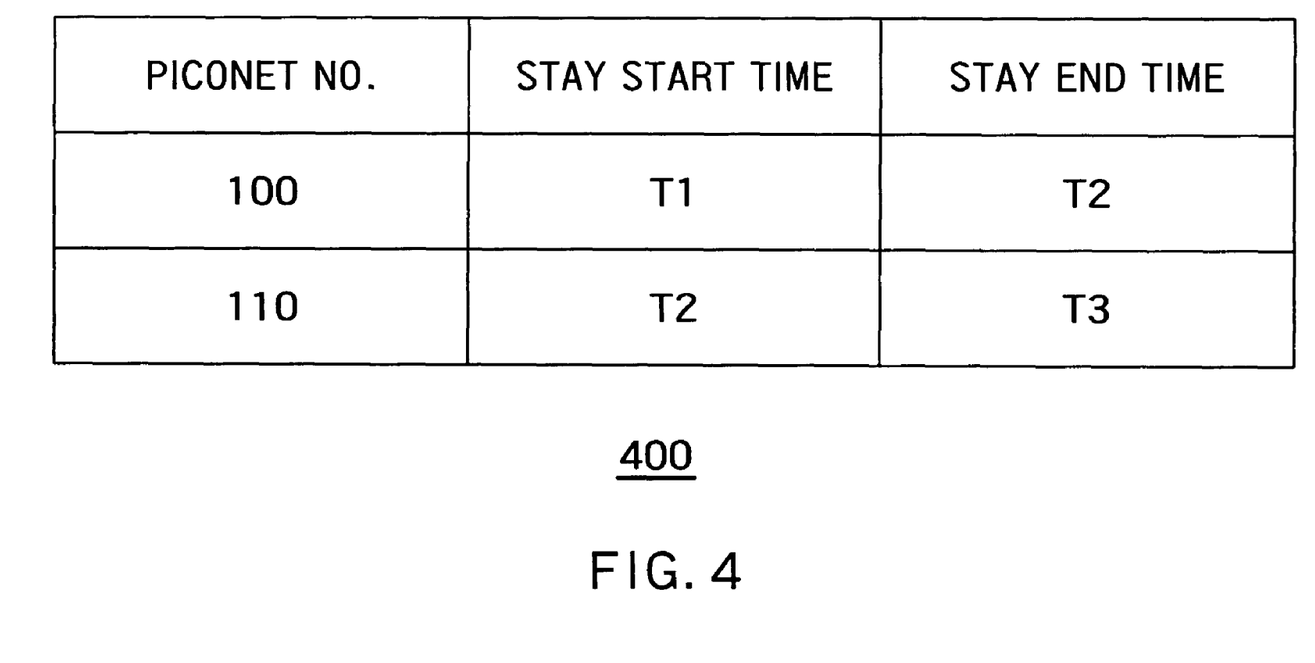
FIG. 4 is a diagram showing an example of information retained in a piconet stay history retainer.

The piconet stay history retainer 305 retains history information as to from when, how long, and to which piconet the slave device 120 was piconet-switched in the past. The retained stay history information contains at least history information which stayed one time before in the past. FIG. 4 shows an example of retained information 400 in the piconet stay history retainer 305.

The traffic parameter retainer 306 has a function of retaining information of traffic parameters obtained at the time of setting of connection to the master device or each time communication is conducted. Here, the traffic parameters are, for example, an average transmission interval and an average transmission rate of transmission data.

The piconet switching executor 307 is ordered to conduct piconet switching by the piconet switching controller 303. The piconet switching executor 307 conducts processing such as changing over the piconet of the receiving destination.

Figure 5:
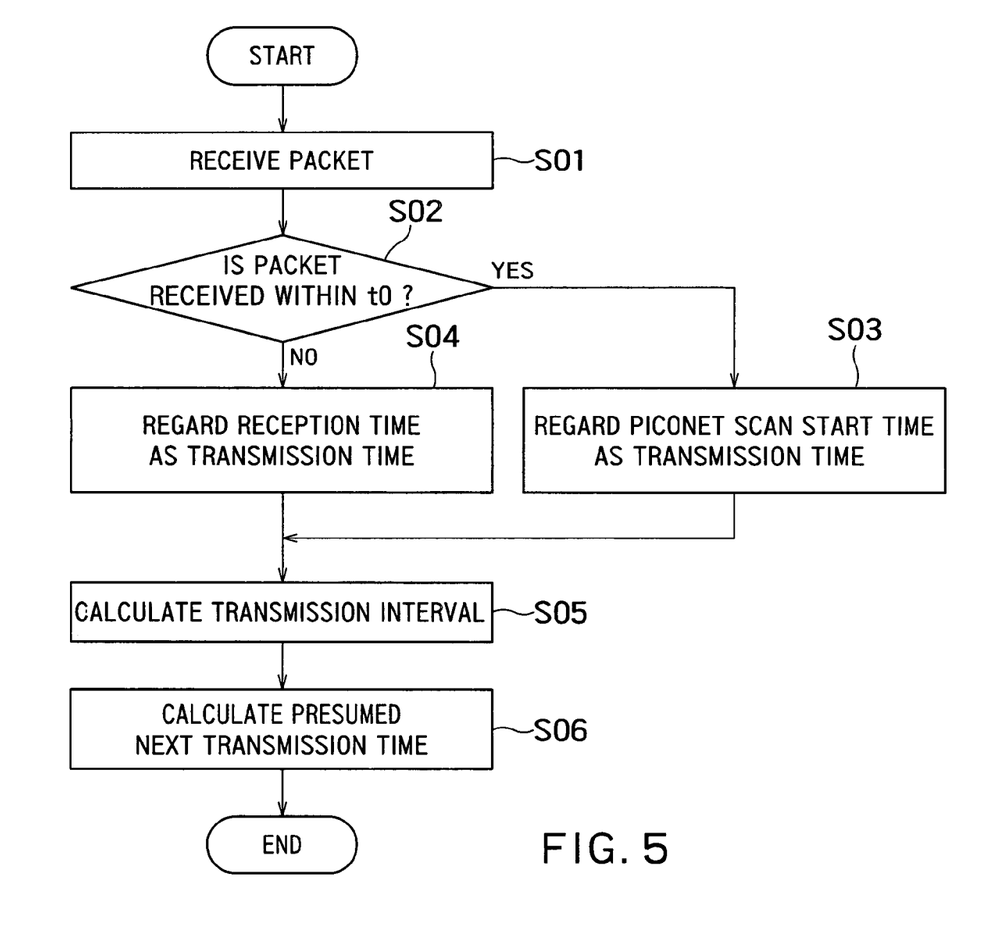
FIG. 5 is a diagram showing an example of a method for calculating the presumed (expected) next transmission time in a first embodiment.

FIG. 5 is a diagram showing an example of a method for calculating the presumed (expected) next transmission time in the present embodiment.

First, data is received from a certain master device (step S01). An elapsed time between the time when data is received and the time when piconet switching is conducted immediately before the data reception is measured, and it is determined whether the measured time is equal to or less than a predetermined value t0 (step S02). If the measured time is equal to or less than t0, the received data is judged to be data obtained by retransmission of data which has been transmitted by the master device before the time of the immediately preceding piconet switching. This data is regarded as first transmitted immediately after further immediately preceding piconet switching was executed (step S03). On the other hand, if the time when data is received is later than t0, then this data is judged not to be retransmitted data, and the time when the data is received is regarded as time when transmission is started (step S04).

After the time when the received data was first transmitted is presumed as described above, the transmission interval from the master device is calculated on the basis of information obtained at the time when setting connection used in transmission and reception of the data (step S05). Thereafter, time when the master device is presumed to transmit the next time can be calculated on the basis of the presumed time (S03 or S04) when the data was first transmitted and the transmission interval found at the step S05 (step S06). Hereafter, this will be described in detail with reference to drawings.

Figure 6:
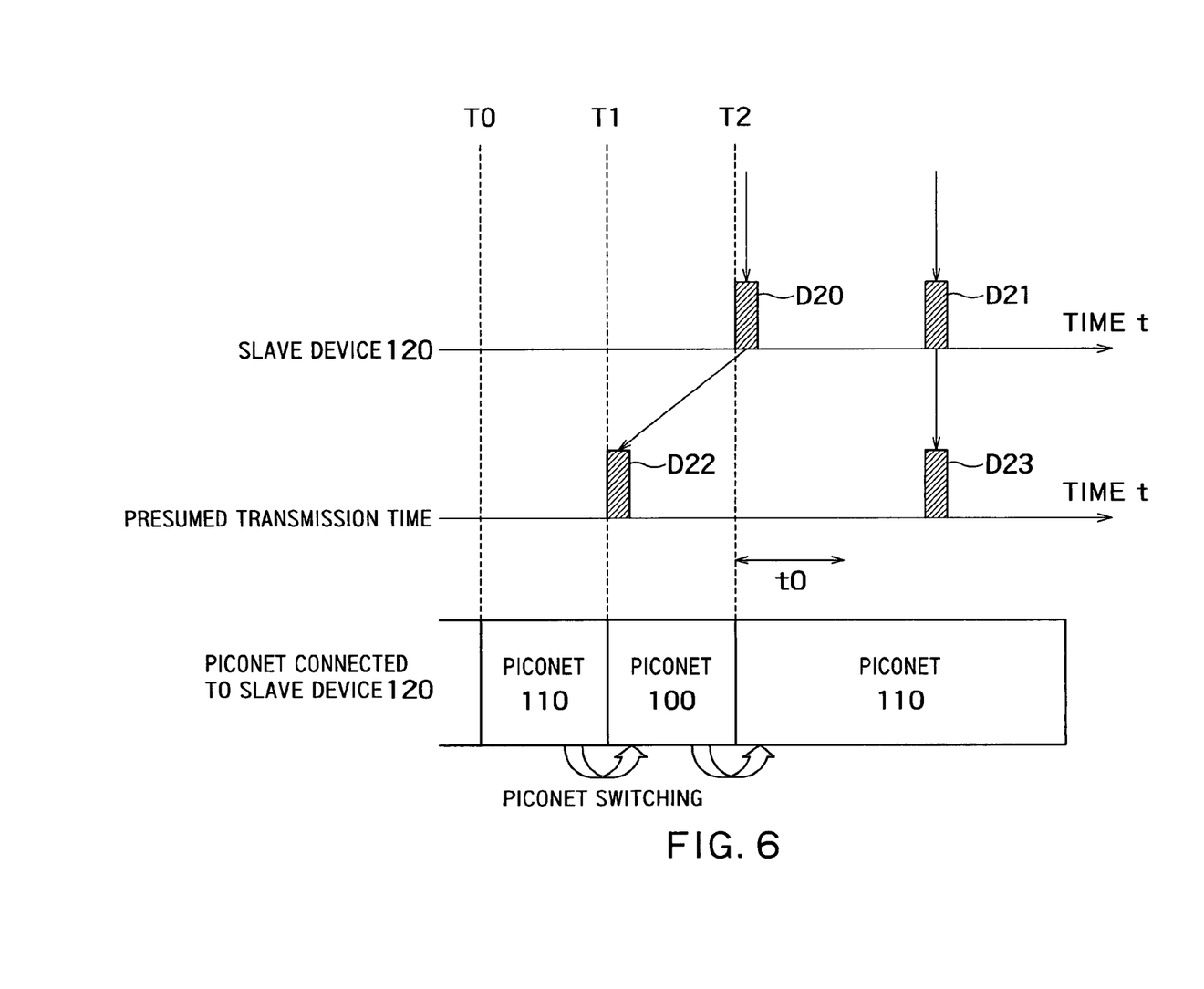
FIG. 6 is a diagram showing an example of a method for presuming time when certain received data has been transmitted first.

FIG. 6 shows a method for presuming the time when certain received data was first transmitted in the present embodiment.

It is supposed that the slave device 120 is piconet-switched to the piconet 110 at time T0. Subsequently, the slave device 120 is piconet-switched to the piconet 100 at time T1, and the slave device 120 is piconet-switched to the piconet 110 at time T2.

It is supposed that slave device 120 receives data D20 immediately after the time T2. If the difference between the time when the data D20 is received and the time T2 is equal to or less than the predetermined time interval t0, then it is judged that there is a possibility that the data D20 was first transmitted between the time T1 and the time T2. And the data D20 is judged to be obtained by retransmission of data D22 immediately after the switching to the piconet 100, i.e., at the time T1. In other words, it is presumed that the time when the data D20 was first transmitted is T1. By the way, the received data D20 is transmitted to the master device 101 when the slave device 120 is connected to the piconet 100.

On the other hand, if a time period between the time T2 when piconet switching to the piconet 110 is conducted and time when data is received is longer than the time interval t0 as represented by data D21, then the data D21 is judged not to be obtained by retransmission and the data D21 is regarded as transmitted at the reception time of the data D21 as represented by data D23. By the way, the received data D21 is transmitted to the master device 101 when the slave device 120 is connected to the piconet 100.

Here, the time interval t0 must be determined by taking the data retransmission time interval of the master device into consideration. If the time interval t0 is equal to or more than the data retransmission time interval of the master device, a certain decision whether the received data is retransmitted data can be made. However, a false decision tends to occur when the received data is obtained by first data transmission. Therefore, the time interval t0 should be set so as to decrease the influence of these false decisions.

Figure 7:
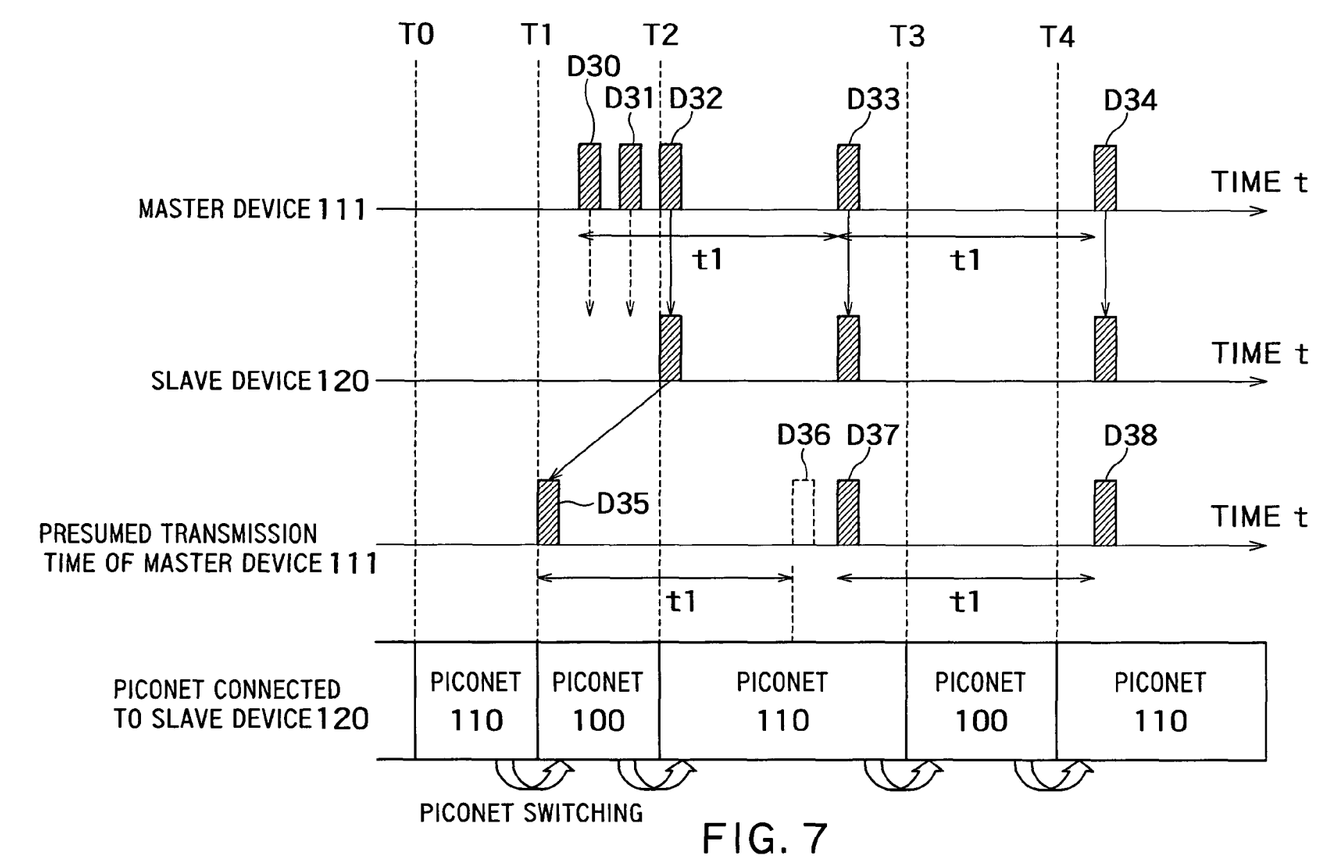
FIG. 7 is a diagram showing an example of a method for presuming next transmission time in a first embodiment.

FIG. 7 is a diagram showing an example of a method for presuming next transmission time in the present embodiment.

Data D30 transmitted by the master device 111 is not received until the slave device 120 is piconet-switched to the piconet 110 to which the master device 111 belongs. Data D31 and data D32 shown in FIG. 7 are data retransmitted because the slave device 120 is piconet-switched to the piconet 100 and reception is not completed. Since the retransmitted data D32 made possible to receive by piconet switching at time T2 is data received immediately after the time T2 (within time interval t0), the time when the data D32 is actually transmitted is regarded as time T1 as represented by data D35.

Subsequently, a transmission interval t1 of the master device 111 is found. The transmission interval can be found using the following method.

(1) Average Transmission Interval Information which is One of Traffic Parameters is Used If traffic parameters declared by the master device 111 when setting the connection between the slave device 120 and the master device 111 include an average transmission interval (W seconds) of transmission data, the transmission interval t1 can be calculated using the average transmission interval. To be more precise, supposing a presumed (expected) transmission time to be t, next data transmission time t' can be presumed according to the following equation.

$$t'=t+W$$

(2) Average Transmission Rate Information which is One of Traffic Parameters is Used If traffic parameters declared by the master device 111 when setting the connection include an average transmission rate ("a" octets/second) of transmission data, the transmission interval t1 can be calculated using the average transmission rate. Supposing data received last time has a size of n octets, next data transmission time t' can be presumed according to the following equation.

$$t'=t+n/a$$

If data D32 is regarded as transmitted at time T1, then presumed next transmission time (i.e., presumed next reception time) presumed according to the above-described calculation method should become the transmission interval t1 after the time T1, i.e., time t' indicated by data D36 in FIG. 7.

If the next transmission time (reception time) t' of the master device 111 can be thus presumed, it is possible to prevent occurrence of waiting time of the master device 111 caused by piconet switching of the slave device 120 to a piconet different from that of the master device 111 as far as possible, by conducting piconet switching at the time t' to the piconet to which the master device 111 belongs. At this time, the timing of the piconet switching may be manipulated by prolonging the stay time of the slave device 120 in the piconet 110 so as to contain the time t'. Or it is also possible to conduct piconet-switching to the piconet 110 at least at the time t' if the slave device 120 is already piconet-switched to another piconet.

Here, as shown in FIG. 7, it is also possible to consider the case where the time of actually received data is deviated from the predicted time t' as represented by data D37 while the slave device 120 is piconet-switched to the piconet 110 so as to contain the time t' and kept waiting. This is because the first transmission time of data received as data D32 is regarded as time T1 even if the data is transmitted at any time between the time T1 and time T2. At this time, actually received data D37 can be used as information of the presumed next transmission time. By doing so, the presumed next transmission time is presumed to be time of data D38 which is a time interval t1 after reception of the data D37. If the slave device 120 is piconet-switched to the piconet 110 again at this time, therefore, a delay is not caused by reception-waiting in the slave device 120.

Variant of the First Embodiment

In the method for finding the presumed transmission time of the master device 111 (presumed reception time of the slave device 120) in the present embodiment, the transmission time may be found on the basis of past presumed information instead of immediately preceding actual reception results.

(1) Average Transmission Interval Information which is One of Traffic Parameters is Used Presumed next transmission time t" can be found on the basis of a presumed transmission time t'(x) of the master device 111 presumed x times before in the past. For example, the presumed time t" when data transmitted in a connection which declares the average transmission interval included in traffic parameters to be W seconds is transmitted the next time can be represented by the following equation.

$$t'' = t'(x) + x \times W \text{ where } x \geq 1$$

(2) Average Transmission Rate Information which is One of Traffic Parameters is Used Presumed next transmission time t" can be found on the basis of a presumed transmission time t'(x) of data having a size n(x) received from the master device 111 x times before in the past. For example, the presumed time t" when data transmitted in a connection which declares the average transmission rate included in traffic parameters to be "a" octets/second is transmitted the next time can be represented by the following equation.

$$t'' = t'(x) + \sum_{i=1}^{x} n(i)/a$$

where $x \geq 1$

When presuming transmission time of data of the next time on the basis of the presumed transmission time of data received x times before in the past, it is desirable, as selection method of x, that data received x times before is data received a predetermined time after (i.e., time interval t0 after) piconet-switching to the piconet to which the master device belongs. Because in the case of received data obtained by retransmission, the first transmission time becomes inaccurate in some cases. Therefore, it is desirable to select data received after elapse of t0 when the transmission time of the master device can be regarded as the same time as the reception time. In this manner, it becomes possible to presume the next transmission time at higher precision.

In an alternative method, the next data transmission time is presumed for each of a plurality of data received in the past, on the basis of the presumed transmission time of the data, and a minimum one among as many presumed next transmission times as the number of data is determined as the presumed next data transmission time. In this case as well, it is desirable that a plurality of data adopted as received data are data received in a predetermined time after the piconet-switching to the piconet to which the master device belongs.

What is claimed is:

1. A communication mediation apparatus which mediates communication between networks, comprising:
 a switching unit configured to switch connection destination networks;
 a packet receiver configured to receive a packet, from a first communication device belonging to a network under connection, addressed to a second communication device belonging to another network;
 a traffic parameter storage configured to store information concerning communication traffic determined with the first communication device as a traffic parameter;
 a packet reception time calculator configured to calculate expected reception time of a packet transmitted next from the first communication device on the basis of a reception history of packets from the first communication device and the traffic parameter stored in the traffic parameter storage; and
 a controller configured to control the switching unit so as to switch the connection destination network,
 wherein the traffic parameter includes an average transmission interval of packets, and
 the packet reception time calculator calculates the expected reception time of the packet next transmitted from the first communication device, on the basis of the reception time of a packet from the first communication device received X (where X is an integer of one or more) times before and the average transmission interval.

2. The communication mediation apparatus according to claim 1, wherein if the packet X times before is received within a threshold period from a time when the connection destination network is switched to a first network to which the first communication device belongs, then the packet reception time calculator determines a time corresponding to the average transmission interval *X after a certain time in a period when own apparatus is connected to a second network which is the connection destination network before the connection destination network is switched to the first network, as the expected reception time.

3. The communication mediation apparatus according to claim 1, wherein if the packet X times before is received within a threshold period from a time when the connection destination network is switched to a first network to which the first communication device belongs, then the packet reception time calculator determines a time corresponding to the average transmission interval *X after a time when the connection destination network is switched to a second network which is the connection destination network before the connection destination network is switched to the first network, as the expected reception time.

4. The communication mediation apparatus according to claim 2, wherein the packet reception time calculator uses a retransmission interval time of packets as the threshold period.

5. The communication mediation apparatus according to claim 1, further comprising a parameter acquirer configured to acquire the traffic parameter from the first communication device when establishing connection with the first communication device.

6. A communication mediation apparatus which mediates communication between networks, comprising:
- a switching unit configured to switch connection destination networks;
- a packet receiver configured to receive a packet, from a first communication device belonging to a network under connection, addressed to a second communication device belonging to another network;
- a traffic parameter storage configured to store information concerning communication traffic determined with the first communication device as a traffic parameter;
- a packet reception time calculator configured to calculate expected reception time of a packet transmitted next from the first communication device on the basis of a reception history of packets from the first communication device and the traffic parameter stored in the traffic parameter storage; and
- a controller configured to control the switching unit so as to switch the connection destination network, wherein
- the traffic parameter includes an average transmission rate of packets, and the packet reception time calculator calculates the expected reception time of the packet next transmitted from the first communication device, on the basis of the reception time of a packet from the first communication device received X (where X is an integer of one or more) times before, a data size of a packet received from the first communication device in each of times ranging from X times before to one time before, and the average transmission rate.

7. The communication mediation apparatus according to claim 6, wherein if the packet X times before is received within a threshold period from a time when the connection destination network is switched to a first network to which the first communication device belongs, then the packet reception time calculator determines a time corresponding to $$\sum_{i=1}^{X} n(i)/a$$

(where n(i) is a data size of a packet received i times before, and "a" is an average transmission rate) after a certain time in a period when own apparatus is connected to a second network which is the connection destination network before the connection destination network is switched to the first network, as the expected reception time.

8. The communication mediation apparatus according to claim 6, wherein if the packet X times before is received within a threshold period from a time when the connection destination network is switched to a first network to which the first communication device belongs, then the packet reception time calculator determines a time corresponding to $$\sum_{i=1}^{X} n(i)/a$$

(where n(i) is a data size of a packet received i times before, and "a" is an average transmission rate) after a time when the connection destination network is switched to a second network which is the connection destination network before the connection destination network is switched to the first network, as the expected reception time.

9. The communication mediation apparatus according to claim 7, wherein the packet reception time calculator uses a retransmission interval time of packets as the threshold period.

10. A communication method for a communication mediation apparatus which mediates communication between networks, comprising:
- switching connection destination networks;
- receiving a packet, from a first communication device belonging to a network under connection, addressed to a second communication device belonging to another network;
- calculating expected reception time of a packet transmitted next from the first communication device on the basis of a reception history of packets from the first communication device and a traffic parameter that is information concerning communication traffic determined with the first communication device; and
- switching the connection destination network, wherein
- the traffic parameter includes an average transmission interval of packets, and
- the calculating includes calculating the expected reception time of the packet next transmitted from the first communication device, on the basis of the reception time of a packet from the first communication device X (where X is an integer of one or more) times before and the average transmission interval.

11. The communication method according to claim 10, wherein if the packet X times before is received within a threshold period from a time when the connection destination network is switched to a first network to which the first communication device belongs, then the calculating includes determining a time corresponding to the average transmission interval *X after a certain time in a period when own apparatus is connected to a second network which is the connection destination network before the connection destination network is switched to the first network, as the expected reception time.

12. A communication method for a communication mediation apparatus which mediates communication between networks, comprising:
- switching connection destination networks;
- receiving a packet, from a first communication device belonging to a network under connection, addressed to a second communication device belonginglo another network;
- calculating expected reception time of a packet transmitted next from the first communication device on the basis of a reception history of packets from the first communication device and a traffic parameter that is information concerning communication traffic determined with the first communication device; and
- switching the connection destination network, wherein
- the traffic parameter includes an average transmission rate of packets, and
- the calculating includes calculating the expected reception time of the packet next transmitted from the first communication device, on the basis of the reception time of a packet from the first communication device received X (where X is an integer of one or more) times before, a data size of a packet received from the first communication device in each of times ranging from X times before to one time before, and the average transmission rate.

13. The communication method according to claim 12, wherein if the packet X times before is received within a threshold period from a time when the connection destination network is switched to a first network to which the first communication device belongs, then the calculating includes determining a time corresponding to $$\sum_{i=1}^{X} n(i)/a$$

(where n(i) is a data size of a packet received i times before, and "a" is an average transmission rate) after a certain time in a period when own apparatus is connected to a second network which is the connection destination network before the connection destination network is switched to the first network, as the expected reception time.

14. A computer readable medium storing a program for causing a computer capable of mediating communication between networks, to execute instructions to perform steps comprising:
  switching connection destination networks;
  receiving a packet, from a first communication device belonging to a network under connection, addressed to a second communication device belonging to another network;
  calculating expected reception time of a packet transmitted next from the first communication device on the basis of a reception history of packets from the first communication device and a traffic parameter that is information concerning communication traffic determined with the first communication device; and
  switching the connection destination network, wherein
  the traffic parameter includes an average transmission interval of packets, and
  the calculating includes calculating the expected reception time of the packet next transmitted from the first communication device, on the basis of the reception time of a packet from the first communication device received X (where X is an integer of one or more) times before and the average transmission interval.

15. The computer readable medium according to claim 14, wherein if the packet X times before is received within a threshold period from a time when the connection destination network is switched to a first network to which the first communication device belongs, then the calculating includes determining a time corresponding to the average transmission interval *X after a certain time in a period when own apparatus is connected to a second network which is the connection destination network before the connection destination network is switched to the first network, as the expected reception time.

16. A computer readable medium storing a program for causing a computer capable of mediating communication between networks, to execute instructions to perform steps comprising:
  switching connection destination networks,
  receiving a packet, from a first communication device belonging to a network under connection, addressed to a second communication device belonging to another network;
  calculating expected reception time of a packet transmitted next from the first communication device on the basis of a reception history of packets from the first communication device and a traffic parameter that is information concerning communication traffic determined with the first communication device; and
  switching the connection destination network, wherein
  the traffic parameter includes an average transmission rate of packets, and
  the calculating includes calculating the expected reception time of the packet next transmitted from the first communication device, on the basis of the reception time of a packet from the first communication device received X (where X is an integer of one or more) times before, a data size of a packet received from the first communication device in each of times ranging from X times before to one time before, and the average transmission rate.

17. The computer readable medium according to claim 16, wherein if the packet X times before is received within a threshold period from a time when the connection destination network is switched to a first network to which the first communication device belongs, then the calculating includes determining a time corresponding to $$\sum_{i=1}^{X} n(i)/a$$

(where n(i) is a data size of a packet received i times before, and "a" is an average transmission rate) after a certain time in a period when own apparatus is connected to a second network which is the connection destination network before the connection destination network is switched to the first network, as the expected reception time.

* * * * *